US 9,147,220 B2

(12) United States Patent (10) Patent No.: US 9,147,220 B2
Yoo (45) Date of Patent: Sep. 29, 2015

(54) SYSTEMS AND METHODS TO FACILITATE SEARCHES BASED ON SOCIAL GRAPHS AND AFFINITY GROUPS

(71) Applicant: Yellowpages.com LLC, Glendale, CA (US)

(72) Inventor: David Yoo, San Mateo, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 0 days.

(21) Appl. No.: 14/516,875

(22) Filed: Oct. 17, 2014

(65) Prior Publication Data

US 2015/0120589 A1   Apr. 30, 2015

Related U.S. Application Data

(63) Continuation of application No. 13/841,695, filed on Mar. 15, 2013, now Pat. No. 8,868,552, which is a continuation of application No. 12/116,169, filed on May 6, 2008, now Pat. No. 8,417,698.

(51) Int. Cl.
*G06F 17/30* (2006.01)
*G06Q 50/00* (2012.01)
*G06Q 10/10* (2012.01)
*G06Q 30/02* (2012.01)

(52) U.S. Cl.
CPC ............ *G06Q 50/01* (2013.01); *G06F 17/3053* (2013.01); *G06F 17/30867* (2013.01); *G06Q 10/10* (2013.01); *G06Q 30/02* (2013.01)

(58) Field of Classification Search
CPC .................................................. G06F 17/3053
USPC ......... 707/716, 723, 732, 737, 738, 754, 802; 709/203, 219
See application file for complete search history.

(56) References Cited

U.S. PATENT DOCUMENTS

| 6,643,639 | B2 | 11/2003 | Biebesheimer et al. |
| 7,620,647 | B2* | 11/2009 | Stephens et al. ........................ 1/1 |
| 7,689,624 | B2* | 3/2010 | Huang et al. ................... 707/760 |
| 7,945,565 | B2 | 5/2011 | Poblete et al. |
| 8,386,469 | B2* | 2/2013 | Reuther et al. ................. 707/715 |
| 8,412,770 | B2* | 4/2013 | Marcucci et al. .............. 709/204 |
| 2002/0042793 | A1* | 4/2002 | Choi ................................. 707/6 |
| 2002/0042794 | A1 | 4/2002 | Konaka |
| 2007/0192300 | A1 | 8/2007 | Reuther et al. |
| 2007/0198506 | A1 | 8/2007 | Attaran Rezaei et al. |
| 2008/0189169 | A1 | 8/2008 | Turpin et al. |

* cited by examiner

*Primary Examiner* — Marc Filipczyk
(74) *Attorney, Agent, or Firm* — Kilpatrick Townsend & Stockton LLP

(57) ABSTRACT

Business, recommendation, and social relationship graph information for businesses may be received from a data source social networking website, where each business is recommended by users. The recommendation information may indicate users that recommend certain businesses. The social relationship graph information may indicate user-specific networks of social relationships on the social networking website. For a user query including business and affinity group selection criteria, business, recommendation, and social relationship graph information may be searched to select businesses that: match the business selection criteria; and are recommended by users having social relationships within a maximum degree of closeness with the querying user and being in an affinity group matching the affinity group selection criteria. The selected businesses may be ranked based on numbers of recommending users and social relationship graph information. A search result, with businesses indicated in a rank order and with business and recommendation information, may be provided.

20 Claims, 6 Drawing Sheets

FIGURE 5

SYSTEMS AND METHODS TO FACILITATE SEARCHES BASED ON SOCIAL GRAPHS AND AFFINITY GROUPS

CROSS-REFERENCES TO RELATED APPLICATIONS

This application is a continuation of U.S. Ser. No. 13/841,695, filed on Mar. 15, 2013, entitled "SYSTEMS AND METHODS TO FACILITATE SEARCHES BASED ON SOCIAL GRAPHS AND AFFINITY GROUPS," which is a continuation of Ser. No. 12/116,169, filed on May 6, 2008, entitled "SYSTEMS AND METHODS TO PROVIDE SEARCH BASED ON SOCIAL GRAPHS AND AFFINITY GROUPS," now U.S. Pat. No. 8,417,698, the entire disclosures of each of which are incorporated herein by reference for all purposes.

BACKGROUND

Field

At least some embodiments of the disclosure relate generally to the field of information searches and, more particularly but not limited to, identifying and presenting relationship-based recommendations for searches.

BRIEF SUMMARY

Methods, machine-readable media, apparatuses and systems are provided to identify and/or present information based on relationship-based recommendations.

DESCRIPTION OF THE RELATED ART

Some search tools allow a user to search using a search query. For example, a user may enter a location and a query for "Italian restaurants" to identify Italian restaurants in a specified area.

BRIEF DESCRIPTION OF THE DRAWINGS

These and other features, aspects, and advantages will become better understood with regard to the following description, appended claims, and accompanying drawings where:

FIG. 5 illustrates a screen display of another embodiment of a search interface.

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the disclosure includes methods, machine-readable media, apparatuses and systems to identify and/or present information based on relationship-based recommendations. The information may be search results; and the relationship-based recommendations may be recommendations or preferences specified by related people in one or more social networks or affinity groups. For example, the search results can be presented in an order based at least in part on the recommendations and the relationship between the people who made the recommendations and the person who requested the search results.

Figure 1:
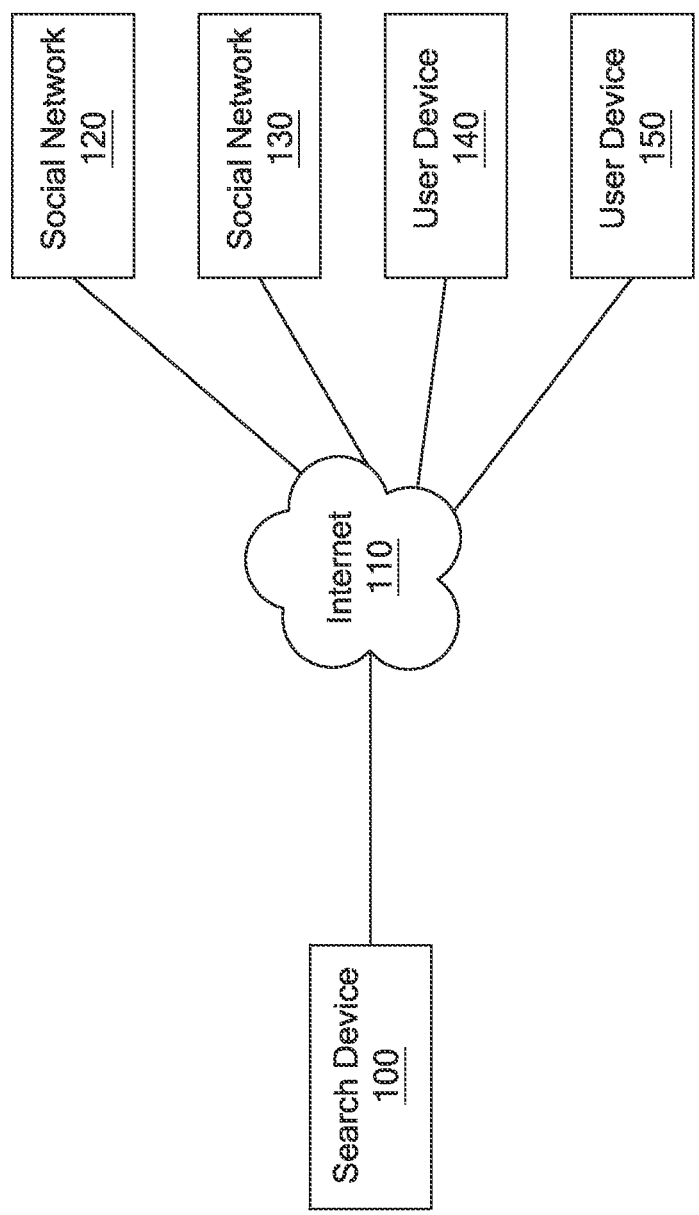
FIG. 1 is a diagram of one embodiment of a system for performing a search method.

FIG. 1 is a diagram of one embodiment of a system for performing a search method.

In some embodiments, a search device (e.g., 100) aggregates recommendations of businesses, service providers, products, information, entertainment programs, merchants, etc., on one or more social networks (e.g., 120, 130, etc.), tracks the user identifications of those making the recommendations on the social networks (e.g., 120, 130, etc.) and retrieves the relationships between user identifications from the social networks. The search device also provides search results in response to a searching user's search query. The search device selects businesses that are most relevant based on the search query and the number of recommendations of each business from users that are most closely related to the searching user. In some embodiments, the search device counts only the number of recommending users of a predetermined degree of closeness to the searching user. The searching user can use the rank of the business in the search result, the number of recommending users and the identity of some or all of the recommending users to influence their decision as to which business to use. Generally speaking, the recommendations of more closely related recommending users are more relevant to a searching user than recommendations of more distantly related or unrelated users.

In FIG. 1, people use user devices (e.g., 140, 150) to connect to services through the internet (110). User devices (e.g., 140, 150) can take many forms including desktop and notebook computers, mobile phones, and personal digital assistants (PDAs). In the illustrated embodiment, the user device 140 and the user device 150 are configured to be connected through the internet 110 to the social network 120, the social network 130 and the search device 100.

The social network 120 and the social network 130 may take various forms. Social networks include online communities where users interact and establish relationships with each other. Examples of social networks include the FACEBOOK®, MySpace® and Linkedin® web sites. (FACEBOOK, MySpace and Linkedin are registered trademarks of Facebook, Inc., Myspace, Inc. and Linkedin Corporation, respectively.) Users of social networks (e.g., 140, 150) interact with each other in various ways including chat, email, file sharing, blogging, and affinity groups. Affinity groups may be groups that people join for any number of reasons such as to express a particular interest, engage in discussions about a particular subject or express a relationship with other members. Users of social networks establish relationships with each other in various ways on the social networks, including by joining common affinity groups, becoming "friends" or making a "connection."

A person using a user device (e.g., 140, or 150) may log into a social network (e.g., 120 or 130) to interact and establish relationships with other users. In some cases, the same person may access the social networks using different user devices at different times. For example, the person may use their desktop computer when at work, their laptop computer in a meeting, and their mobile phone when on the road. In each case, the person is identified to the social network by using a user identification to log into the social network from one of the user devices. In some cases, the user may use the user device 140 to concurrently log into both the social network 120 and the social network 130.

A first person may use the user device 140 to connect through the internet 110 to the social network 120. A second person may use the user device 150 to connect through the internet 110 to the social network 120. The first person may interact and become friends with the second person on the social network 120. Similarly, the first and second person may also interact and become friends on the social network 130.

In some embodiments, users log into a social network or their user device using a user identification and password. In some cases, the user is somewhat anonymous in that the user identification is a user name or screen name. In other cases, the user identification may be associated with more specific identifying information, such as the user's real name or social security number. In some embodiments, a person is identified by different user names depending on which social network or user device they are accessing. In such embodiments, the search device may associate a common user identification with each of the user names so that information associated with this person may be aggregated across multiple information sources.

The first person may click on a widget in a web page on the social network 120 to indicate that the user prefers or recommends a first business. The widget is a mechanism for allowing the user to interact with the social network 120. For example, the widget may be a button, checkbox, or drop down list in a web page on the social network 120. The second person may click a widget in a web page on the social network 120 that indicates that the user prefers or recommends the first business as well. The second person may recommend a second business instead of or in addition to the first business. Similarly, other users may indicate preferences for one or more businesses on the social network 120 and the social network 130. Furthermore, these users may interact similarly with other social networks.

The context and processes for indicating these preferences and recommendations may be implemented in any of a number of ways on each of these social networks. For example, a user may browse a list of businesses from a database and click on a widget associated with a particular business to indicate a preference. In other cases, a user may review the recommended businesses of other users and click on a widget to adopt a particular recommendation as their own.

In some cases, a user may log into an account managed by the search device 100 using a user identification and make recommendations directly associated with the user profile maintained by the search device 100. For example, the user may visit the web site of a business and click on a button on their browser to add that business to their recommended businesses as stored in their account on the search device. In other cases, the user logs into the social network using a user identification and makes the recommendations within the context of that social network. The search device 100 subsequently retrieves this information from the social network and associates the information with the user profile maintained by the search device.

In some embodiments, users of the social networks recommend businesses by clicking on a widget associated with a particular business to indicate that the user prefers or recommends that business. These recommendations and preferences may be available to other users in various ways including by viewing the recommending user's profile on the social network or receiving announcements of new recommendations through a messaging feature of the social network. The social network may employ other methods of indicating and sharing a preference or recommendation for certain businesses.

In some embodiments, users select one of several levels of favorites to indicate the strength of a recommendation. For example, user may click on one of two buttons to indicate that a particular business is either "recommended" or "highly recommended." In other cases, a multiple point scale may be used to indicate the strength of the recommendation. Other methods for users to indicate a preference for a certain business may be used. In some embodiments, these recommended businesses may be listed in the favorite list in the profile of the user on the social network or internet site In the illustrated embodiment, the search device 100 is coupled through the internet 110 to the social network 120 and the social network 130. The search device 100 includes one or more computers configured to perform the functionality described herein. For example, the search device may include one or more computers to implement web server functionality to interface with the user devices 140 and 150 and social networks 120 and 130 over the internet. Furthermore, the search device may include one or more databases configured to manage information including user profiles and recommended businesses and configured to search that information in response to search queries. The databases are configured to store multiple relationships between user identifications, a list of favorite businesses of each user identification, and relationships between each user identification and an affinity group or social network.

The search device 100 interacts with the social networks 120 and 130 and aggregates recommended businesses and user identifications of people that recommend each recommended business on the social networks. The search device 100 also retrieves one or more relationship graphs (e.g., 210 illustrated in FIG. 2) from the social network 120 and the social network 130. The relationship graphs include information about the relationships between user identifications on the social networks. For example, the relationship graph may include information about which users are members of each affinity groups, which users are directly related as friends or connections, and which users are more remotely connected through intermediate friends or connections, such as a friend of a friend.

In some cases, the user identifications are the login identifier for each social network. The social network 110 may maintain a relationship graph indicating the relationships of each user based on a unique user identification (for example, login id) for those users on the social network 110 and the social network 120 may maintain a relationship graph indicating the relationships of each user based on the unique user identification for those users on the social network 120. In many cases, a particular person's login id for one social network will not be the same on another social network. In some embodiments, the user identifications known to be associated with the same person (aliases) in different social networks are associated each other to allow the relationship graphs from several social networks to be merged at least partially based on the known aliases. In some cases, the search device 100 independently uses each relationship graph for each social network based on the internally unique user identifications within each social network. In other cases, the search device 100 uses a merged relationship graph based on the internally unique user identifications within each social network and aliases across social networks.

The user device 140 and the user device 150 are also connected over the internet 110 to the search device 100. Persons can submit business search queries on their user devices. For example, a person wanting to find someone to fix their Porche, may submit a search query "Porsche mechanic" to the user device 140 using a keyboard or voice input, for example. The user device 140 submits the search query over the internet 110 to the search device 100. In some cases, a location of the searching user is provided to the search device 140 so that the search service can prioritize relevant businesses based at least in part by distance from the searching user. The search device 100 provides the search results over the internet to the user device 140 to the searching user.

In some embodiments, the search device 100 selects businesses in response to a search query based at least in part on the number of recommendations of each business by recommending users of a certain degree of closeness to the searching user in the one or more relationship graphs. For example, the search device 100 may select and rank businesses based at least in part on the number of recommendations from recommending users with a direct relationship with the searching user. In other cases, the search device 100 counts users with recommendations from recommending users with second degree, third degree and higher degree relationships with the searching user and ranks the businesses at least in part based on these counts.

In some embodiments, the search device 100 counts only recommendations from users in certain affinity groups or particular social networks. For example, if the searching user is searching for a financial advisor, the searching user might only be interested in the recommendations of people in a selected affinity group. In some cases, the user specifies a particular affinity group or social network to include based for example on their perception of the relevant expertise of members of that group or network. In other cases, the selection of groups or networks to include is done automatically based on the search query. For example, the search device 100 may only count relationships within finance related groups if the search device 100 determines that the search query is related to a finance related matter.

In some embodiments, the search device 100 transmits the search results over the internet 110 to the user device 140. The user device 140 presents the search results with an indication of one or more numbers of recommendations according to one or more criteria. In some cases, the one or more number of recommendations may include the number of recommendations overall. In some cases, one or more numbers of recommendations are presented for one or more particular categories, such as number of recommendations among each of the searching user's first degree relationships, second degree relationships, and third degree relationships. Other categories may include the number of recommending users that are a member of a particular affinity group or a member of a particular social network.

The user device 140 also presents the search results with an indication of one or more user identifications associated with recommendations. In some cases, all the user identifications associated with the recommended business are presented. The search results may include user identifications selected or prioritized based on the recommending user's relevance to the searching user. In some embodiments, the most relevant users may be recommending users with the closest relationships to the searching user. The closest relationships are ones which the searching user may recognize and find most persuasive in influencing their selection of one of the presented businesses. In some embodiments, the relevance of recommending users may be based on one or more factors including the degree of closeness of the relationship between the two user identifications, the number of independent relationships connecting the two user identifications, the number of common group memberships, and the relevance of each affinity group to the search query.

In some embodiments, the search query is submitted to the search device by an application in a social network. For example, users of a social network may load a social network application to provide for business search queries in their social network profile, provide a mechanism for the user to identify and share favorite businesses on that social network and also allow the search device to access that user's favorite businesses and relationships on that social network.

In other embodiments, the search query is submitted through an application programming interface (API) to the search device. For example, the API may provide for business search queries in their social network profile, provide a mechanism for the user to identify and share favorite businesses on that website and also allow the search device to access that user's favorite businesses and relationships on that website. In some cases, the search results not only includes the recommendations from recommending users in the network of the searching user, but also recommendations from recommending users associated with the website incorporating the API.

For example, an API as incorporated in a newspaper website may allow the search device to aggregate the business recommendations of the newspaper website users. The search device can then include the newspaper website user recommendations in search results provided to the newspaper website. A product review website may incorporate the API to include the recommendations of users of the product review website.

In some embodiments, the search device 100 aggregates recommendations of all users of the website. In other embodiments, the API can be configured to specify that recommendations from a specific subset of users on the website are included. For example, the search device 100 might aggregate the recommendations of newspaper editors on the newspaper website and aggregate the recommendations of product review staff on the product review website.

In some cases, the recommendations of these the users associated with the website are incorporated into the search results on the website for all searches. In other embodiments, the recommendations of these us are only incorporated into certain types of searches, such as search queries related to their area of expertise. For example, only restaurant recommendations of the restaurant critics on the newspaper website might be incorporated into the search results.

Figure 2:
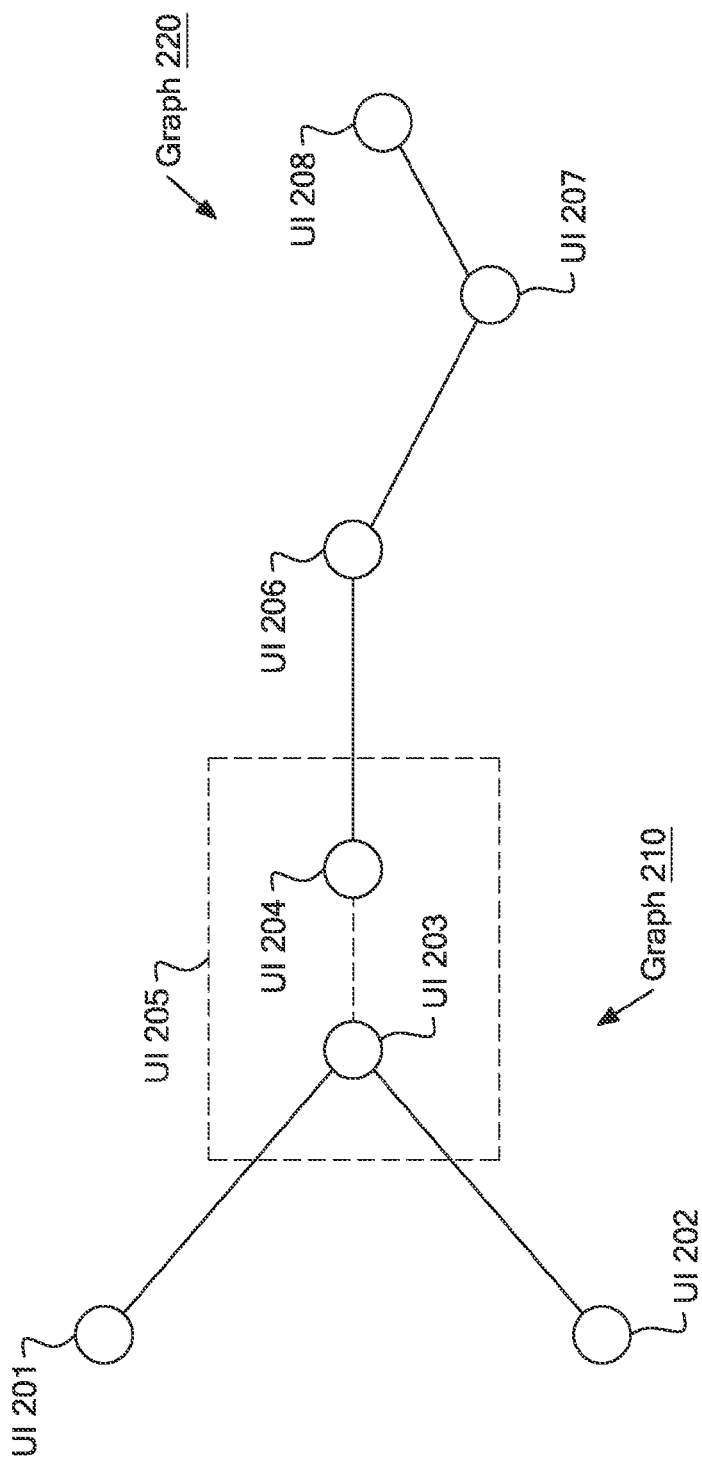
FIG. 2 is a diagram of one embodiment of a relationship graph.

FIG. 2 shows a graphical representation of one embodiment of two relationship graphs. The relationship graphs are described with reference to FIG. 1.

A graph 210 represents a portion of the relationship information that the search device 100 receives from the social network 120 and a graph 220 represents a portion of the relationship that the search engine receives from the social network 130. The relationship graphs are simplified in order to more clearly illustrate the concept. In some embodiments, there are millions of user identifications interconnected in each relationship graph.

On the graph 210, a user identification (UI) 201 is connected to a UI 203 and the UI 203 is connected to a UI 202. In some embodiments, these connections may be established in response to people associated with a pair of user identifications becoming "friends," making a connection or joining a common affinity group, for example, on the social network 120. In some embodiments, the connections between user identifications on the graphs include information about the types and number of relationships between the corresponding user identifications.

On the graph 220, a UI 208, being connected to a UI 207 directly, has a first degree relationship with the UI 207. The UI 208, being connected to a UI 206 through the UI 207, has a second degree relationship with the UI 206. The UI 208, being connected to a UI 204 through the UI 207 and the UI 206, has a third degree relationship with a UI 204. Higher order relationships between two user identifications include additional intermediate relationships between the user identifications.

In some embodiments, the search device 100 independently uses the relationship graphs (e.g., 210, 220) received from each social network (e.g., 120, 130) to carry out a method as described herein. In other embodiments, the search device 100 merges the relationship graphs from different social networks (e.g., 120, 130) based on aliases of user identifications provided to the search device 100. More than one user identification (aliases) may be associated with the same person on one or more social networks. For example, a person may use the UI 203 for the social network 120 and the UI 204 for the social network 130. When the person registers with the search device 100, the person may indicate the user identifications the person uses on each of one or more social networks (e.g., 120, 130). The search device 100 may create a UI 205 to associate with or replace both the UI 203 and the UI 204 in the relationship graph used by the search device 100. In addition, the search device 100 may merge the graph 210 and the graph 220 by associating user identifications that the search device 100 determines is associated with the same person. For example, if the search device determines that UI 203 is associated with the same person as UI 204, then the graph 210 and the graph 220 can be merged by combining UI 203 and UI 204 into UI 205. This merged graph can lead to additional relationships between graphs. For example, if graph 210 is merged with graph 220 at UI 205, UI 206 has a second degree relationship with UI 201 even though the user identifications are initially received from different social networks.

In some embodiments, the search device 100 may receive only a portion of the relationship information available to the social networks due to privacy controls and other access restrictions for each social network. For example, the social network 120 may only allow the search device 100 to retrieve the direct relationships (e.g., friends list) of registered users that grant access to the search device 100. In other cases, the social network grants access to user identifications of second, third and higher degree relationships of the registered users. Users of the social network may become a registered user of the search device 100 and grant access to the search device 100 by loading an application on the social network 120 that enables such access.

In some embodiments, registered users submit profile information on their user device and the user device submits that profile information to the search device 100. The profile information may include one or more user identifications associated with that person on one or more social networks. The search device 100 may use that information to access the portions of the relationship graphs available for that user from the social networks and merge the relationship graphs from two or more social networks based on aliases for that person across the social networks (e.g., 120, 130).

In some embodiments, the social network (e.g., 120 or 130) and the application allow for the users to control what information is provided to the search device 100. Each social network may have independent restrictions that control accessibility of the relationship information by the search device 100. Furthermore, the search device 100 may not merge user identifications across different social graphs because the search device 100 may not receive information about all the user identifications that are associated with the same person.

In other embodiments, the relationship graphs may be represented in other ways and incorporate other relationship information.

Figure 3:
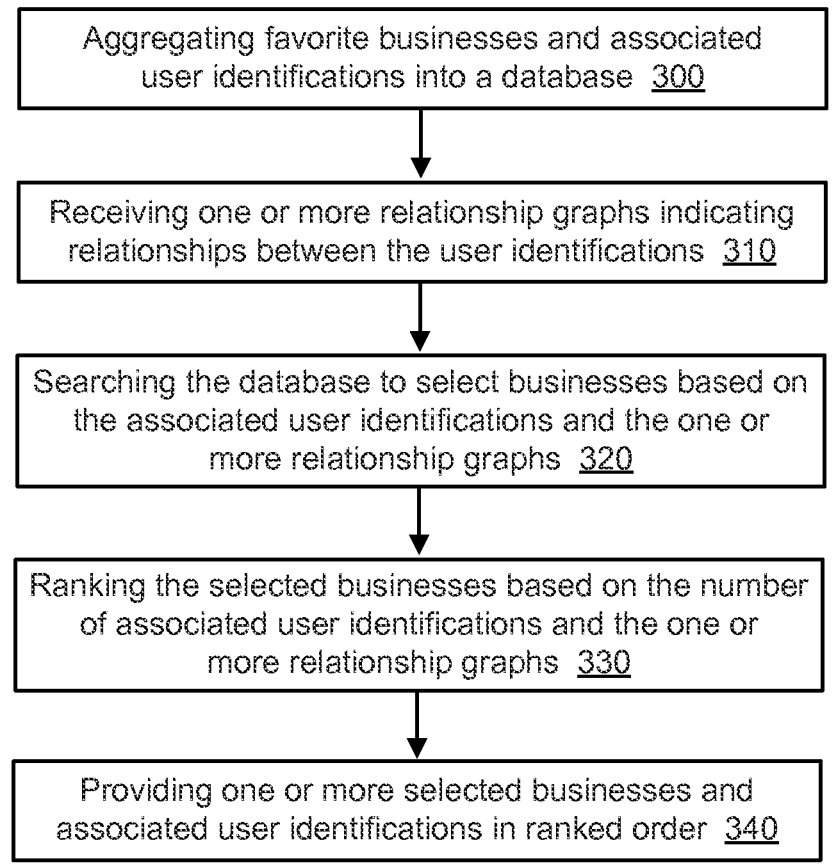
FIG. 3 is a flow chart illustrating one embodiment of a method of a search method.

FIG. 3 shows a flow chart of one embodiment of a search method. In some embodiments, the process is implemented in a system as illustrated in FIG. 1. However other general or special purpose apparatus and systems may be used to carry out a process contemplated to be within the spirit and scope of this disclosure.

In process 300, a search device 110 aggregates preferred or recommended businesses and associated user identifications of the persons recommending each business. In one embodiment, the search device 110 is communicatively coupled to one or more sources of preferred or recommended businesses, such as a social network (e.g., 120 or 130) or a browser running on a user device (e.g., 140 or 150).

In some embodiments, the search device 110 aggregates favorite businesses and associated user identifications by interfacing with the social networks (e.g., 120 or 130) through an application programming interface (API). In some embodiments, the search device aggregates favorite businesses and associated user identifications by interfacing with a user device running a browser with a browser plug-in. A user may visit a website of a business using the browser and click on a widget to identify that business as a favorite business. In some embodiments, the user device (e.g., 140 or 150) transmits the business and a user identification to the search device (100). In other embodiments, the user device saves that favorite business locally on the user device to be retrieved by the search device at a later time. In some embodiments, the user identification is the login identification specified by logging into the search device using the browser plug in.

In other embodiments, the search device 100 aggregates favorite businesses and associated user identifications by screen scraping, data extraction and other methods of mining information from sources such as data files and web pages.

In process 310, the search device 100 receives one or more relationship graphs (e.g., 210, 220) to indicate the relationship between user identifications. The various social networks (e.g., 120, 130) and other sources of preferred or recommended businesses are accessed to receive a relationship graph indicating the relationships between the user identifications on that social network or other source of preferred or recommended businesses.

In some embodiments, the relationship graph (e.g., 210, 220) received by the search device 100 represents only a portion of the relationship information on the social network (e.g., 120 or 130) due to privacy restrictions limiting access to some user identifications and relationships on that social network. In some embodiments, the search device may only have access to the user identifications most closely connected to users granting access to the search device. Furthermore, in some embodiments, the degree of accessibility of user identifications associated with a specific user identification may depend on privacy configuration settings for that specific user. In addition, a user identification can be association with different user names for each of several sources of favorite businesses so that the relationship graphs for each of those several sources can be merged.

The user identifications may be user names, screen names, real names, or social security numbers, for example. In some embodiments, relationships are established by being members of a common affinity group. For example, the relationship graph may indicate two user identifications are associated with each other as members of a common FACEBOOK group. Furthermore, the relationship graph may indicate two user identifications are associated with each other because they established a connection with each other on Linkedin or became "friends" with each other on MySpace. In some cases, the relationship graph may indicate relationships of two or more degrees by tracking user identification relationships through one or more intermediate user identifications.

In process 320, the search device 100 searches one or more databases to select businesses based on the associated user identification and the one or more relationship graphs. In one embodiment, the search device receives a search query and selects businesses most relevant to the search query based on keyword matching, semantic matching, popularity ranking, concept matching or other methods of using a search query to select businesses.

In some embodiments, the database contains only preferred or recommended businesses having at least one associated user identification. Each associated user identification corresponds to a person that indicated a preference or recommendation for the corresponding business. In other embodiments, the database also includes businesses that do not have an associated user identification.

In some embodiments, the search device 100 selects businesses at least in part based on the number of associated user identifications in the database. In some cases, the search device selects only businesses with a predetermined minimum number of associated user identifications or the highest number of user identifications in the database. Alternatively, the search device selects 100 only the most relevant relationships to the searching user. For example, the search device may count those associated user identifications within a predetermined maximum degree of closeness between the user identification of the recommending users and the searching users.

In some cases, closeness may also be based on the number of independent relationships between two users. For example, two users may be directly related though a friendship. These two users may be considered to have a closer relationship when they are also members of the same group as compared to two users that do not share a common group. Furthermore two users that share multiple common groups and have friendships or connections on multiple sites or social networks may be considered to be closer than those that have fewer connections.

In some cases, the search device 100 selects the businesses using a database query that incorporates a search string related to identifying relevant businesses, the associated user identifications to indicate the number of recommendations and the relationship of the recommending users to the searching user according to one or more relationship graphs. In other embodiments, the search device selects the businesses used two or more steps including a database search to identify relevant businesses and one or more filtering processes to extract only those businesses that meet certain other qualifications. These qualifications may include having a minimum number of user recommendations overall, having a minimum number of recommendations from recommending users within a maximum degree of closeness to the searching user, and having a minimum number of recommendations from recommendations within one or more selected affinity groups. Other single or multi-step processes may be used to identify selected businesses may be used.

In process 330, the search device 100 ranks the selected businesses based on the associated user identification and the one or more relationship graphs. In one embodiment, the search device receives a search query and selects businesses most relevant to the query and ranks them according to the number of associated user identifications within a maximum degree of closeness with the searching user.

In process 340, the search device 100 provides the search result including one or more selected businesses and associated user identifications in the ranked order. In one embodiment, the search device provides the search result over a network, such as the internet, to the user device of the searching user. In other embodiments, the user device provides the one or more selected businesses and associated user identifications in ranked order to a display. In yet other embodiments, the user device provides the one or more selected businesses and associated user identifications in ranked order to a text-to-speech device to present the information in audio form. Other methods of providing the search result to a searching user may be used.

Figure 4:
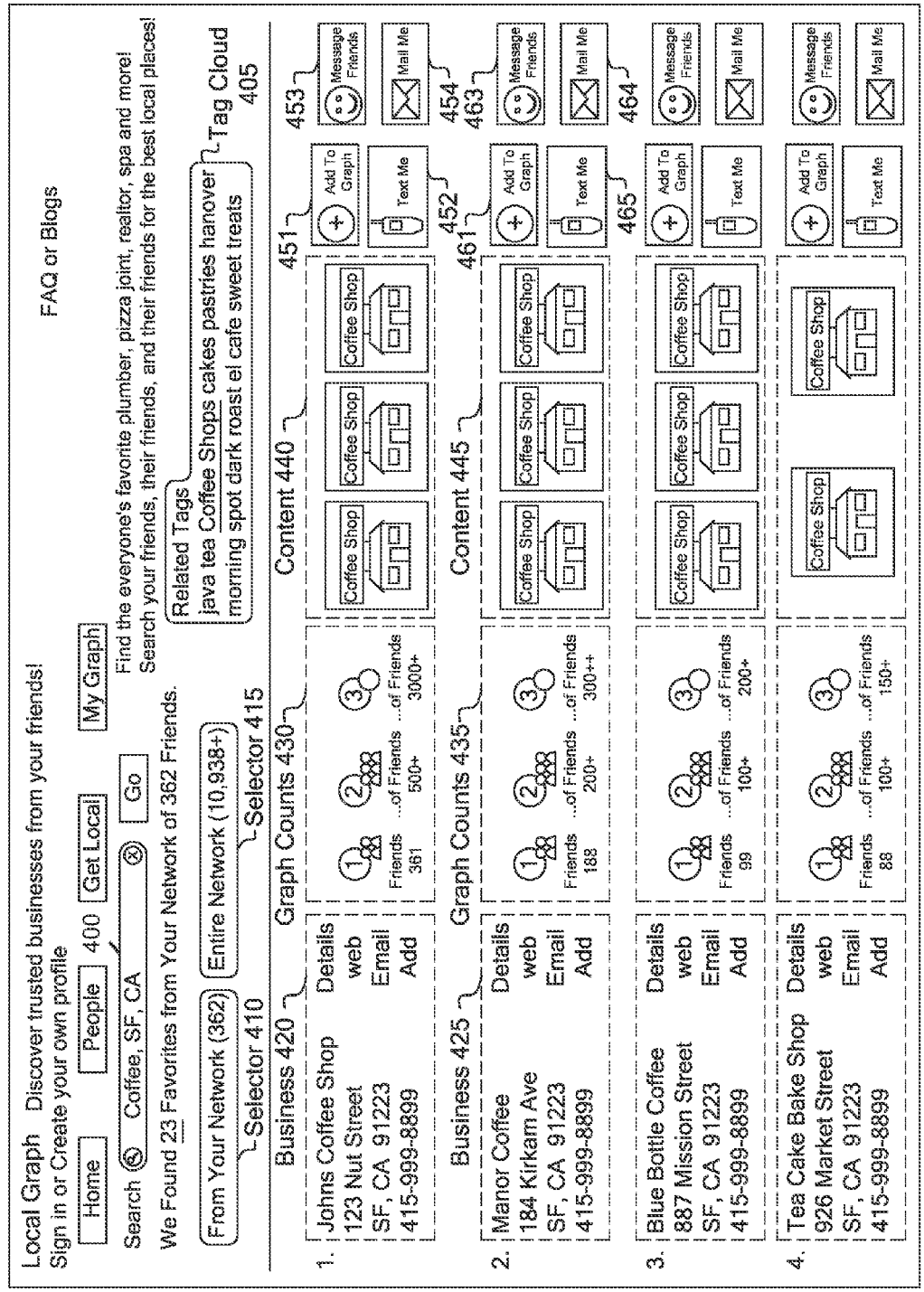
FIG. 4 illustrates a screen display of one embodiment of a search interface.

FIG. 4 illustrates a screen display of a business search interface according to one embodiment. The screen display represents a display of business search interface on a computer, PDA, or mobile telephone, for example.

A search query 400 is submitted, by a user device (e.g., 140 or 150) to a search device 100, in a field on the display. In some embodiments, the search query 400 includes a text string like "coffee" to be used to identify businesses relevant to the searching user's need or want. The search device may use the search query 400 for keyword matching, semantic matching, concept matching or other ways to identify the most relevant businesses within a database. For example, "coffee shops" may be identified through simply matching the keyword "coffee" from the search query with the names and descriptions of businesses in the database. In some cases, synonyms may be recognized such as "java" and in other cases more sophisticated search techniques are used.

In some embodiments, the search query 400 also includes a location, such as "San Francisco, Calif." or "SF, CA". The location is used to select or prioritize businesses in part based on how close the business is to this location. In other embodiments, a default location from the searching user's profile is used when a location is not specified in the search query. In yet other embodiments, the location of the user device (e.g., 140 or 150) is submitted with the search query. The location of the user device may be automatically determined using a global positioning system (GPS) or other position determining apparatus integrated into or communicatively coupled with the user device.

A tag cloud 405 displays tags related to the search query 400. The tag cloud 405 may include related search terms most frequently used in previous search queries that included one or more terms in the search query 400. The size of the related search term may relate to the relative frequency of that term in previous search queries using at least one term in the search query 400. In one embodiment, clicking on a related search term in the tag cloud 405 modifies the search query 400 to include the related search term. A new tag cloud may be produced based on the modified search query.

A selector 410 and a selector 420 is a widget on the page that allows the user to select which categories of recommendations should be counted to present a ranked list of recommended businesses.

If selector 410 is clicked, all recommendations in the searching user's network are counted. In one embodiment, the user's network includes all recommending users having a first, second or third degree relationship with the searching user in one or more relationship graphs. In other embodiments, the user's network may be more or less restrictive in terms of the closeness of the relationships included. The user's network may be defined in other ways. If selector 420 is clicked, all recommendations in the entire network are counted. In one embodiment, the entire network may include all recommendations by all recommending users as aggregated by the search device. Additional selectors may be used to predefine different categories of recommendations to count to determine the ranking of selected businesses.

A business 420 includes information associated with a recommended business listed first in the ranked list of businesses and a business 425 includes information associated with a recommended business listed second in the ranked list of businesses. The information associated with each business includes the business name, address, phone number, universal resource locator (URL), email address and other details. Graph counts 430, content 440 and widgets 451, 452, 453 and 454 are associated with the business 420 in the ranked list. Graph counts 435, content 445 and widgets 461, 462, 463 and 464 are associated with the business 425 in the ranked list. Additional businesses are listed in the ranked list of businesses.

In the illustrated embodiment, the graph counts identify the number of recommending users with one degree relationships, with one or two degree relationships, and with one, two or three degree relationships with the searching user. For example, graph counts 430 indicates that the business 420 has 361 recommending users that have first degree (direct) relationships with the searching user, 500+ recommending users that have first or second degree relationships with the searching user and 3000+ recommending users that have first, second or third degree relationships with the searching user.

Content may be associated with the recommended business that is retrieved from the social network or other sources. This content may be user submitted reviews, videos, photos and other information. In some cases, the content may be submitted or otherwise associated with one of the recommending users. For example, the content 440 may be submitted by recommended users counted in the graph 430 and associated with the business 420.

Widget 451 allows the user to add the business 420 as a recommended business associated with their user identification. In some cases, the user identification is one associated with the users profile on the search device. Widget 452 sends the business 420 to their mobile telephone using SMS messaging, for example. Widget 454 sends the business 420 to their email address. Widget 453 sends the business 420 to their friends as determined by the one or more relationship graphs.

Figure 5:
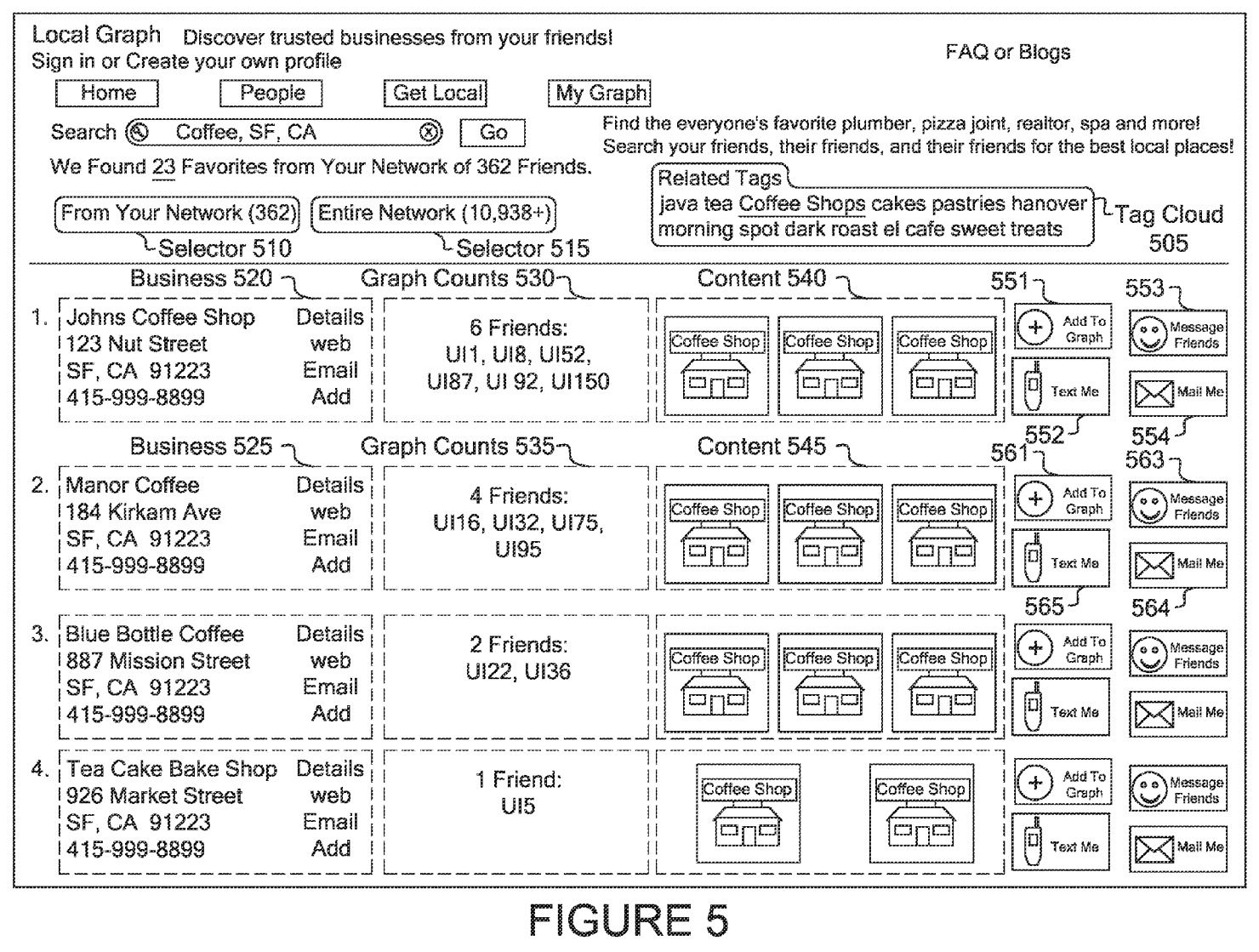

FIG. 5 illustrates a screen display of a business search interface according to another embodiment.

The graph counts 530 displays some or all of the user identifications of recommending users that recommended the business identified in a business 520. In some embodiments, the businesses are ranked by one or more of the different categories of user identifications as described with reference to FIG. 4. In some embodiments, the graph count 530 includes user identifications of some or all of the recommending users for the corresponding business. In some embodiments, only a portion of the user identifications counted in the ranking of each business is listed. In one embodiment, the search device selects which user identifications to present based on the closeness of the relationship to the searching user using on one or more relationship graphs.

The searching user may be influenced to choose a specific one of the selected businesses based on its rank position but also based on the credibility that the searching user attributes to the users indicated by the displayed user identifications. Although the business 525 is ranked below the business 520, the user may attribute more credibility to the recommendation of the associated user identifications in the graph counts 530 than the recommendation of the associated user identifications in the graph counts 535. The searching user may chose a lower ranked selected business over a higher ranked selected business based on the identity of one or more recommending users.

Figure 6:
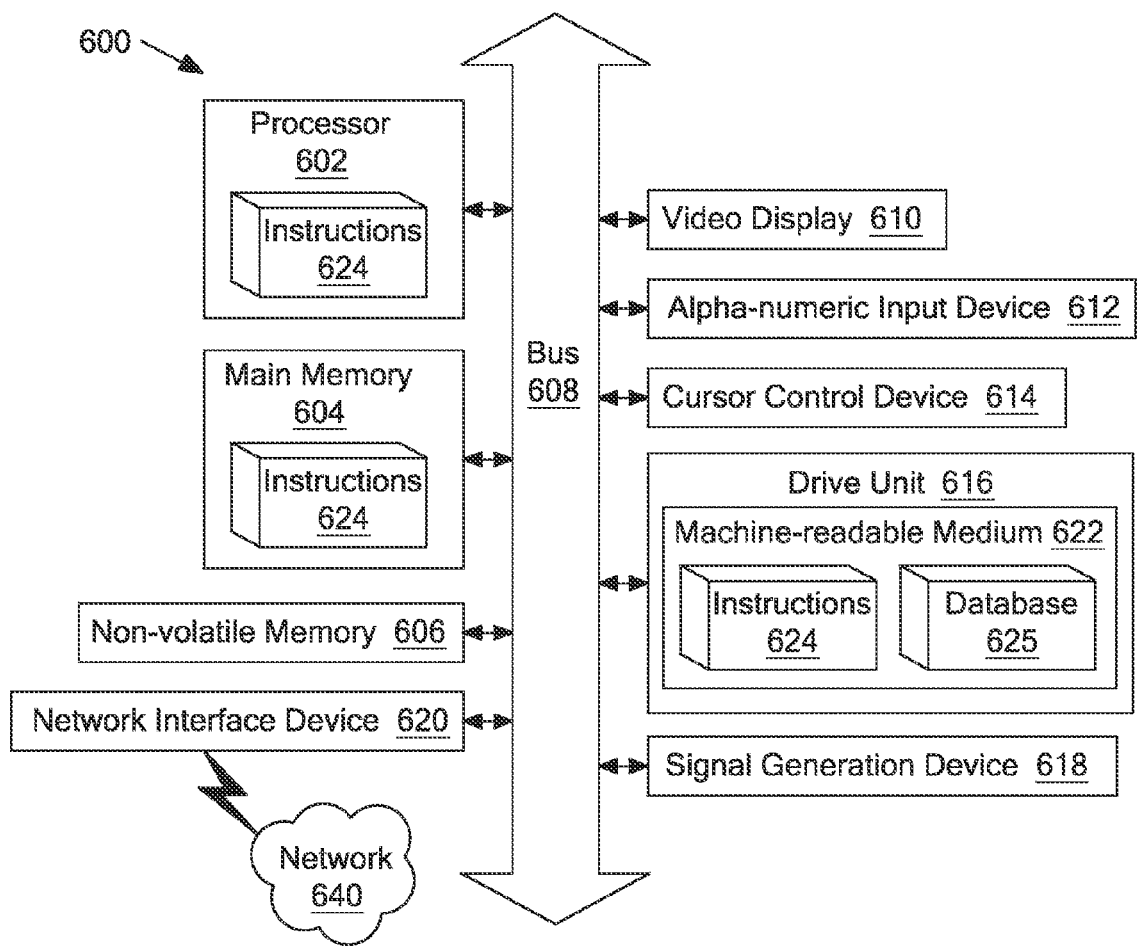
FIG. 6 is a diagrammatic representation of an embodiment of a machine, within which a set of instructions for causing the machine to perform one or more of the methodologies discussed herein may be executed.

FIG. 6 is a diagrammatic representation of an embodiment of a machine 600, within which a set of instructions for causing the machine to perform one or more of the methodologies discussed herein may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

In some embodiments, the machine 600 is a search device 100 according to an embodiment as described herein. In other embodiments, the machine 600 is a component of the search device 100, such as one or more computers within the search device 100. In other embodiments, the machine 600 is a user device (e.g., 140, 150) according to an embodiment as described herein. In one embodiment, the machine 600 is a portion of a social network (e.g., 120, or 130).

The machine 600 includes a processor 602 (e.g., a central processing unit (CPU) a graphics processing unit (GPU) or both), a main memory 604 and a nonvolatile memory 606, which communicate with each other via a bus 608. In some embodiments, the machine 600 may be a desktop computer, a laptop computer, personal digital assistant (PDA) or mobile phone, for example. In one embodiment, the machine 600 also includes a video display 610, an alphanumeric input device 612 (e.g., a keyboard), a cursor control device 614 (e.g., a mouse), a drive unit 616, a signal generation device 618 (e.g., a speaker) and a network interface device 620.

In one embodiment, the video display 610 includes a touch sensitive screen for user input. In one embodiment, the touch sensitive screen is used instead of a keyboard and mouse. The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the computer system 600, the main memory 604 and the processor 602 also including machine-readable media. The instructions 624 may further be transmitted or received over a network 640 via the network interface device 620. In some embodiments, the machine-readable medium 622 also includes a database 625 including the aggregated businesses, associated user identifications and relationship graphs.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories and optical and magnetic media.

In general, the routines executed to implement the embodiments of the disclosure, may be implemented as part of an operating system or a specific application, component, program, object, module or sequence of instructions referred to as "programs." For example, one or more programs may be used to execute specific processes described herein. The programs typically comprise one or more instructions set at various times in various memory and storage devices in the machine, and that, when read and executed by one or more processors, cause the machine to perform operations to execute elements involving the various aspects of the disclosure.

Moreover, while embodiments have been described in the context of fully machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system for managing user profiles stored in association with business information for user-selected businesses and for identifying additional businesses at least partially based on social graph information and affinity group information, the system comprising:
   one or more network interfaces accessible from a network;
   one or more databases to retain one or more of:
      business information;
      social graph information;
      user preference information relating to the business information; and/or
      affinity group information;
   one or more servers coupled to at least one of the one or more network interfaces and to at least one of the one or more databases, the one or more servers to execute instructions to:
      aggregate, via the one or more network interfaces, the social graph information, the user preference information relating to the business information, and the affinity group information from one or more remote data sources;
      identify a first user having a first user profile stored in the one or more databases, the first user profile associated with a first set of business information for a first set of businesses previously selected by the first user for saving in association with the first user profile;
      determine a location corresponding to the first user;
      search for one or more additional businesses relevant to the location, to identify at least one of the one or more additional businesses to the first user with an option to add the at least one of the one or more additional businesses to the first set of businesses previously selected by the first user, the searching comprising:
         processing the social graph information relating to a set of users to identify information about one or more networks of social relationships between two or more users of the set of users, the one or more networks of social relationships being associated with one or more social networking websites, wherein the set of users comprises the first user;
         processing the user preference information relating to a second set of businesses, the user preference information indicating that, for one or more businesses of the second set of businesses, one or more users of the set of users have indicated one or more preferences for the one or more businesses of the second set of businesses;
         process the affinity group information to identify whether the one or more users of the set of users correspond to one or more affinity groups; and
         selecting the at least one of the one or more additional businesses based at least in part on the location, the processing the social graph information, the processing the user preference information, and the processing the affinity group information;
      transmit, via the one or more network interfaces, to an end-user device an indication of the at least one of the one or more additional businesses, causing a user-selectable option to add the at least one of the one or more additional businesses to the first set of businesses previously selected by the first user; and
      responsive to a selection of the user-selectable option, saving additional business information corresponding to the at least one of the one or more additional businesses in association with the first user profile in the one or more databases.

2. The system for managing user profiles stored in association with business information for user-selected businesses and for identifying additional businesses at least partially based on social graph information and affinity group information of claim 1, wherein the aggregating the social graph information, the user preference information relating to the business information, and the affinity group information from one or more remote data sources comprises:

interfacing with one or more social networks via one or more application programming interfaces and aggregating, via the one or more application programming interfaces, at least some of: the social graph information, the user preference information relating to the business information, and/or the affinity group information.

3. The system for managing user profiles stored in association with business information for user-selected businesses and for identifying additional businesses at least partially based on social graph information and affinity group information of claim 1, wherein the aggregating the social graph information, the user preference information relating to the business information, and the affinity group information from one or more remote data sources comprises:

processing transmissions from user devices, the transmissions indicative of user selections of businesses via browser-enabled options facilitated by browser plug-ins.

4. The system for managing user profiles stored in association with business information for user-selected businesses and for identifying additional businesses at least partially based on social graph information and affinity group information of claim 1, wherein the determining the location corresponding to the first user is based at least in part on: a search query; a default location from the first user profile; or an automatically determined location of the end-user device gathered via a position determining apparatus integrated into or communicatively coupled with the end-user device.

5. The system for managing user profiles stored in association with business information for user-selected businesses and for identifying additional businesses at least partially based on social graph information and affinity group information of claim 1, wherein the selecting the at least one of the one or more additional businesses based at least in part on the location, the processing the social graph information, the processing the user preference information, and the processing the affinity group information, comprises:

ranking the second set of businesses based at least in part on distance from the location, at least some of the social relationship graph information, at least some of the user preference information relating to the business information, and at least some of the affinity group information.

6. The system for managing user profiles stored in association with business information for user-selected businesses and for identifying additional businesses at least partially based on social graph information and affinity group information of claim 5, wherein the ranking the second set of businesses comprises determining numbers of users of the set of users that have indicated the one or more preferences for one or more of the second set of businesses, and wherein a representation indicating one or more of the numbers of users of the set of users that have indicated the one or more preferences is transmitted to the end-user device.

7. The system for managing user profiles stored in association with business information for user-selected businesses and for identifying additional businesses at least partially based on social graph information and affinity group information of claim 6, wherein the ranking the second set of businesses comprises differentiating between degrees of relation to the first user, and wherein a representation indicating one or more of the degrees of relation to the first user is transmitted to the end-user device.

8. A method for managing user profiles stored in association with business information for user-selected businesses and for identifying additional businesses at least partially based on social graph information and affinity group information, the method comprising:

aggregating, via one or more network interfaces of a server system, social graph information, user preference information relating to the business information, and affinity group information from one or more remote data sources;

identifying a first user having a first user profile stored in one or more databases of the server system, the first user profile associated with a first set of business information for a first set of businesses previously selected by the first user for saving in association with the first user profile;

determining a location corresponding to the first user;

searching for one or more additional businesses relevant to the location, to identify at least one of the one or more additional businesses to the first user with an option to add the at least one of the one or more additional businesses to the first set of businesses previously selected by the first user, the searching comprising:

processing the social graph information relating to a set of users to identify information about one or more networks of social relationships between two or more users of the set of users, the one or more networks of social relationships being associated with one or more social networking websites, wherein the set of users comprises the first user;

processing the user preference information relating to a second set of businesses, the user preference information indicating that, for one or more businesses of the second set of businesses, one or more users of the set of users have indicated one or more preferences for the one or more businesses of the second set of businesses;

process the affinity group information to identify whether the one or more users of the set of users correspond to one or more affinity groups; and selecting the at least one of the one or more additional businesses based at least in part on the location, the processing the social graph information, the processing the user preference information, and the processing the affinity group information;

transmitting, via the one or more network interfaces, to an end-user device an indication of the at least one of the one or more additional businesses, causing a user-selectable option to add the at least one of the one or more additional businesses to the first set of businesses previously selected by the first user; and responsive to a selection of the user-selectable option, save additional business information corresponding to the at least one of the one or more additional businesses in association with the first user profile in the one or more databases.

9. The method for managing user profiles stored in association with business information for user-selected businesses and for identifying additional businesses at least partially based on social graph information and affinity group information of claim 8, wherein the aggregating the social graph information, the user preference information relating to the business information, and the affinity group information from one or more remote data sources comprises:

interfacing with one or more social networks via one or more application programming interfaces and aggregating, via the one or more application programming interfaces, at least some of: the social graph information, the user preference information relating to the business information, and/or the affinity group information.

10. The method for managing user profiles stored in association with business information for user-selected businesses and for identifying additional businesses at least partially based on social graph information and affinity group information of claim 8, wherein the aggregating the social graph information, the user preference information relating to the business information, and the affinity group information from one or more remote data sources comprises:
processing transmissions from user devices, the transmissions indicative of user selections of businesses via browser-enabled options facilitated by browser plug-ins.

11. The method for managing user profiles stored in association with business information for user-selected businesses and for identifying additional businesses at least partially based on social graph information and affinity group information of claim 8, wherein the determining the location corresponding to the first user is based at least in part on: a search query; a default location from the first user profile; or an automatically determined location of the end-user device gathered via a position determining apparatus integrated into or communicatively coupled with the end-user device.

12. The method for managing user profiles stored in association with business information for user-selected businesses and for identifying additional businesses at least partially based on social graph information and affinity group information of claim 8, wherein the selecting the at least one of the one or more additional businesses based at least in part on the location, the processing the social graph information, the processing the user preference information, and the processing the affinity group information, comprises:
ranking the second set of businesses based at least in part on distance from the location, at least some of the social relationship graph information, at least some of the user preference information relating to the business information, and at least some of the affinity group information.

13. The method for managing user profiles stored in association with business information for user-selected businesses and for identifying additional businesses at least partially based on social graph information and affinity group information of claim 12, wherein the ranking the second set of businesses comprises determining numbers of users of the set of users that have indicated the one or more preferences for one or more of the second set of businesses, and wherein a representation indicating one or more of the numbers of users of the set of users that have indicated the one or more preferences is transmitted to the end-user device.

14. The method for managing user profiles stored in association with business information for user-selected businesses and for identifying additional businesses at least partially based on social graph information and affinity group information of claim 13, wherein the ranking the second set of businesses comprises differentiating between degrees of relation to the first user, and wherein a representation indicating one or more of the degrees of relation to the first user is transmitted to the end-user device.

15. One non-transitory, machine-readable media having machine-readable instructions thereon for managing user profiles stored in association with business information for user-selected businesses and for identifying additional businesses at least partially based on social graph information and affinity group information, which instructions, when executed by one or more processing devices, causes the one or more instructions to:

aggregate, via one or more network interfaces of a server system, social graph information, user preference information relating to the business information, and affinity group information from one or more remote data sources;

identify a first user having a first user profile stored in one or more databases of the server system, the first user profile associated with a first set of business information for a first set of businesses previously selected by the first user for saving in association with the first user profile;

determine a location corresponding to the first user;

search for one or more additional businesses relevant to the location, to identify at least one of the one or more additional businesses to the first user with an option to add the at least one of the one or more additional businesses to the first set of businesses previously selected by the first user, the searching comprising:
processing the social graph information relating to a set of users to identify information about one or more networks of social relationships between two or more users of the set of users, the one or more networks of social relationships being associated with one or more social networking websites, wherein the set of users comprises the first user;
processing the user preference information relating to a second set of businesses, the user preference information indicating that, for one or more businesses of the second set of businesses, one or more users of the set of users have indicated one or more preferences for the one or more businesses of the second set of businesses;
process the affinity group information to identify whether the one or more users of the set of users correspond to one or more affinity groups; and
selecting the at least one of the one or more additional businesses based at least in part on the location, the processing the social graph information, the processing the user preference information, and the processing the affinity group information;

transmit, via the one or more network interfaces, to an end-user device an indication of the at least one of the one or more additional businesses, causing a user-selectable option to add the at least one of the one or more additional businesses to the first set of businesses previously selected by the first user; and responsive to a selection of the user-selectable option, save additional business information corresponding to the at least one of the one or more additional businesses in association with the first user profile in the one or more databases.

16. The one or more non-transitory, machine-readable media for managing user profiles stored in association with business information for user-selected businesses and for identifying additional businesses at least partially based on social graph information and affinity group information of claim 15, wherein the aggregating the social graph information, the user preference information relating to the business information, and the affinity group information from one or more remote data sources comprises:
interfacing with one or more social networks via one or more application programming interfaces and aggregating, via the one or more application programming interfaces, at least some of: the social graph information, the user preference information relating to the business information, and/or the affinity group information.

17. The one or more non-transitory, machine-readable media for managing user profiles stored in association with business information for user-selected businesses and for identifying additional businesses at least partially based on social graph information and affinity group information of claim 15, wherein the aggregating the social graph information, the user preference information relating to the business information, and the affinity group information from one or more remote data sources comprises:

processing transmissions from user devices, the transmissions indicative of user selections of businesses via browser-enabled options facilitated by browser plug-ins.

18. The one or more non-transitory, machine-readable media for managing user profiles stored in association with business information for user-selected businesses and for identifying additional businesses at least partially based on social graph information and affinity group information of claim 15, wherein the determining the location corresponding to the first user is based at least in part on: a search query; a default location from the first user profile; or an automatically determined location of the end-user device gathered via a position determining apparatus integrated into or communicatively coupled with the end-user device.

19. The one or more non-transitory, machine-readable media for managing user profiles stored in association with business information for user-selected businesses and for identifying additional businesses at least partially based on social graph information and affinity group information of claim 15, wherein the selecting the at least one of the one or more additional businesses based at least in part on the location, the processing the social graph information, the processing the user preference information, and the processing the affinity group information, comprises:

ranking the second set of businesses based at least in part on distance from the location, at least some of the social relationship graph information, at least some of the user preference information relating to the business information, and at least some of the affinity group information.

20. The one or more non-transitory, machine-readable media for managing user profiles stored in association with business information for user-selected businesses and for identifying additional businesses at least partially based on social graph information and affinity group information of claim 19, wherein the ranking the second set of businesses comprises determining numbers of users of the set of users that have indicated the one or more preferences for one or more of the second set of businesses, and wherein a representation indicating the one or more of the numbers of users of the set of users that have indicated the one or more preferences is transmitted to the end-user device.

\* \* \* \* \*